United States Patent
Classen

(10) Patent No.: US 7,100,702 B2
(45) Date of Patent: Sep. 5, 2006

(54) TURF AERATOR

(75) Inventor: Larry Classen, Norfolk, NE (US)

(73) Assignee: Schiller-Pfeiffer, Inc., Southampton, PA (US)

( * ) Notice: Subject to any disclaimer, the term of this patent is extended or adjusted under 35 U.S.C. 154(b) by 0 days.

(21) Appl. No.: 10/936,804

(22) Filed: Sep. 9, 2004

(65) Prior Publication Data

US 2006/0048952 A1 Mar. 9, 2006

(51) Int. Cl.
*A01B 33/00* (2006.01)
*A01B 45/00* (2006.01)
*A01B 45/02* (2006.01)

(52) U.S. Cl. .................................... 172/22; 172/123

(58) Field of Classification Search ............ 404/122, 404/132; 172/21, 22, 114, 115, 116, 122, 172/518, 536, 123
See application file for complete search history.

(56) References Cited

U.S. PATENT DOCUMENTS

| | | | |
|---|---|---|---|
| 322,422 A | 7/1885 | Collyer et al. | |
| 1,645,028 A | 10/1927 | Stone | |
| 1,911,693 A | 5/1933 | Jones | |
| 2,384,805 A | 9/1945 | Arens | |
| 2,987,975 A * | 6/1961 | Seaman | 404/132 |
| 3,309,972 A * | 3/1967 | Peters | 404/117 |
| 3,756,203 A | 9/1973 | Dedoes | |
| 4,015,668 A | 4/1977 | Wilson | |
| 4,052,912 A | 10/1977 | Vukelic | |
| 4,157,877 A * | 6/1979 | Lee | 404/128 |
| 4,354,569 A | 10/1982 | Eichholz | |
| 4,550,783 A | 11/1985 | Hansen | |
| 4,704,045 A * | 11/1987 | Taylor et al. | 404/90 |
| 4,776,404 A | 10/1988 | Rogers et al. | |
| 5,101,910 A | 4/1992 | Dawson | |
| 5,207,289 A | 5/1993 | Wilmo | |
| 5,673,756 A | 10/1997 | Classen | |
| 5,680,903 A | 10/1997 | Oliver | |
| 5,797,458 A | 8/1998 | Simon et al. | |
| 6,102,129 A | 8/2000 | Classen | |
| 6,422,321 B1 * | 7/2002 | Dillon | 172/21 |
| 6,494,270 B1 * | 12/2002 | Lawson | 172/554 |
| 6,513,603 B1 | 2/2003 | Bjorge | |
| 6,585,451 B1 * | 7/2003 | Wynings | 404/131 |
| 6,659,190 B1 | 12/2003 | Jessen | |
| 6,684,960 B1 * | 2/2004 | Ng et al. | 172/22 |
| 6,708,773 B1 | 3/2004 | Kinkead et al. | |
| 2004/0154811 A1 | 8/2004 | Kinkead et al. | |

FOREIGN PATENT DOCUMENTS

GB 2164231 * 3/1986

* cited by examiner

*Primary Examiner*—Christopher J. Novosad
(74) *Attorney, Agent, or Firm*—Akin Gump Strauss Hauer & Feld, LLP

(57) ABSTRACT

A turf aerator is provided with three aligned aerator shafts having aerator devices mounted thereon. The innermost shaft is mounted in a frame for free-willing operation and the two outer shafts are each connected to a motor through selectively controlled hydraulic pumps which in turn are connected to hydraulic motors for driving the outermost shafts selectively or simultaneously with the innermost shaft being mounted for free-willing operation.

3 Claims, 5 Drawing Sheets

TURF AERATOR

BACKGROUND OF THE INVENTION

The present invention is directed to a turf aerator and more specifically to an aerator having three separate shafts in axial alignment with each other with the tine assemblies on the middle shaft being mounted for free wheel rotation and the tine assemblies on the left and right shafts being mounted for rotation with the left and right shafts which may be selectively driven or simultaneously driven.

Core-type aerators are well known in the art and are generally comprised of a walk-behind unit having a main frame with an internal combustion engine mounted on the top thereof. A transverse shaft is rotatably mounted adjacent a lower rear portion of the frame and has a plurality of discs secured thereto which in turn support a plurality of radially extending core tines. A suitable drive arrangement is provided between the output shaft of the motor and the tine carrying shaft. A pair of adjustable wheels are pivotally mounted on opposite sides of the frame adjacent the rear thereof which may be adjustable in height under the control of an operator walking behind the aerator. Suitable controls are provided on the handle for controlling the drive to the shaft carrying the core tines. In most models of turf aerators, all of the tine carrying discs are simultaneously rotated since they are mounted on a single transverse shaft to which the drive is imparted. At least one turf aerator model is provided wherein the outermost tine carrying discs are mounted on the shaft for a free wheeling operation.

The aerator disclosed in U.S. Pat. No. 6,102,129 is of the walk behind type and which is provided with two independent tine carrying shafts which are axially aligned with each other for independent rotation relative to each other. Each shaft is selectively connected to an output shaft of a motor mounted on the frame of the aerator by two separate drive trains each having a clutch arrangement therein. A pair of control levers are mounted on a handle assembly for operating the clutches in each drive train. Thus either or both of the tine carrying shafts may be rotated to facilitate a turning operation of the aerator or while traversing a sloping surface.

The aerator disclosed in U.S. Pat. No. 5,680,903 is provided with a series of tine assemblies spaced along a driven shaft driven by a motor. Each tine assembly has a plurality of tines for aeration extending in a substantially radial pattern about the driven shaft. The inner tine assemblies along the middle portion of the driven shaft are secured to the driven shaft to drive the aerator along the lawn as the driven shaft rotates. The outer tine assemblies adjacent the ends of the driven shaft are rotatably mounted on the driven shaft. This permits the outer tine assemblies to free wheel independently and thereby make the aerator more maneuverable and easier to turn.

SUMMARY OF THE INVENTION

The present invention provides an improved turf aerator having three separate shafts in axial alignment with each other with the tine assemblies on the middle shaft being mounted for free-will rotation and the tine assemblies on the left and right shafts mounted for rotation with the shafts which may be selectively or simultaneously driven. The turf aerator is provided with a platform upon which the operator will stand to operate the turf aerator. An internal combustion engine is operatively connected to two hydraulic pumps which in turn are connected to left and right hydraulic motors respectively, which will impart a drive to the left and right tine carrying shafts respectively. The hydraulic motors also provide a drive to the left and right main wheels of the turf aerator respectively.

DETAILED DESCRIPTION OF THE INVENTION

Figure 1:
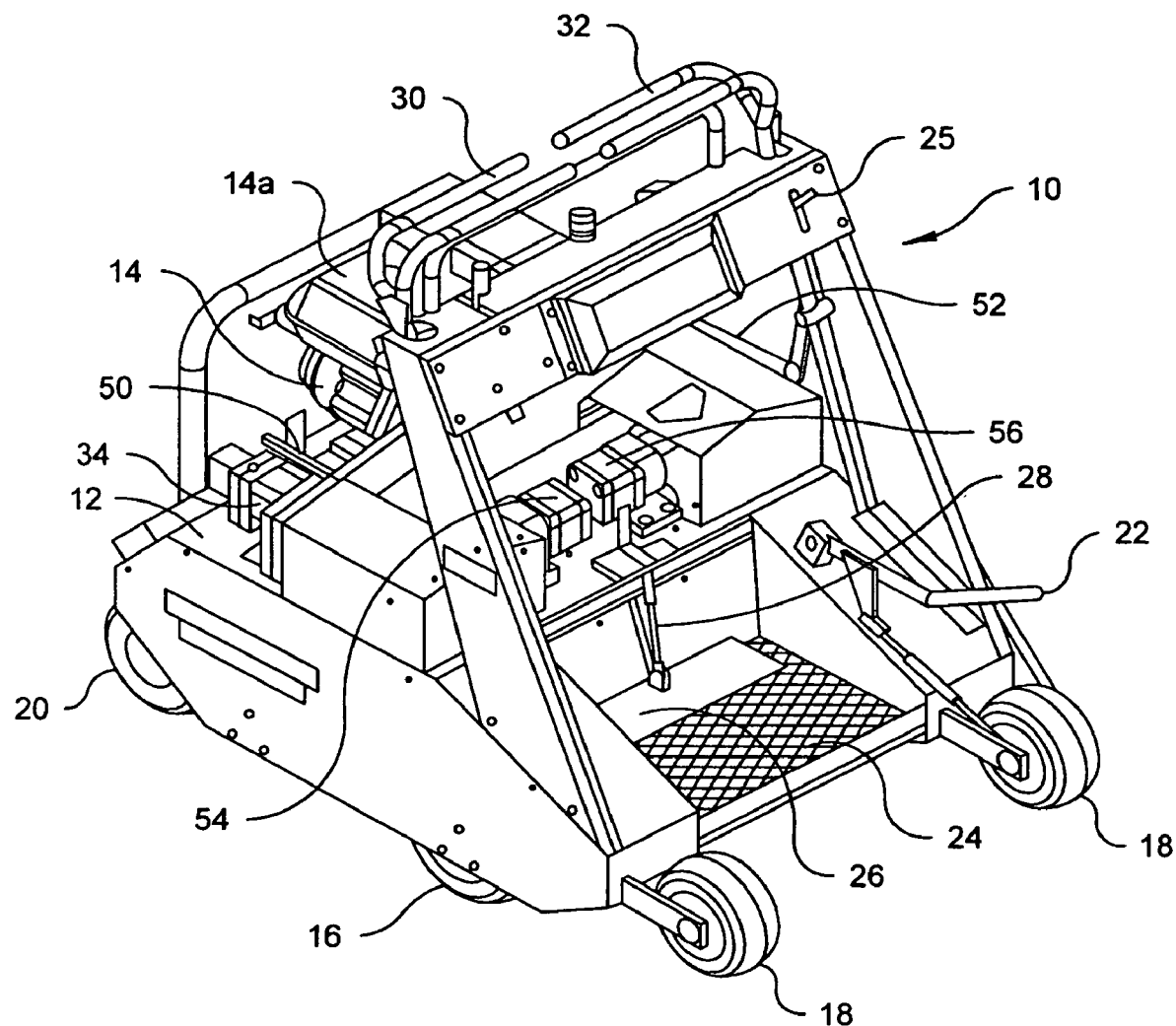
FIG. 1 is a perspective view of the turf aerator of the present invention.

The lawn aerator 10 shown in FIG. 1 is comprised of a main frame 12 having an internal combustion engine 14 mounted on the upper portion thereof. The main frame 12 is supported by a pair of rotatable driven wheels 16, two smaller non-driven wheels 18 on the rear position of the frame and two even smaller non-driven wheels 20 mounted on the front portion of the frame 12. The wheels 18 can be raised and lowered by the lever 22 to stabilize the aerator.

Figure 2:
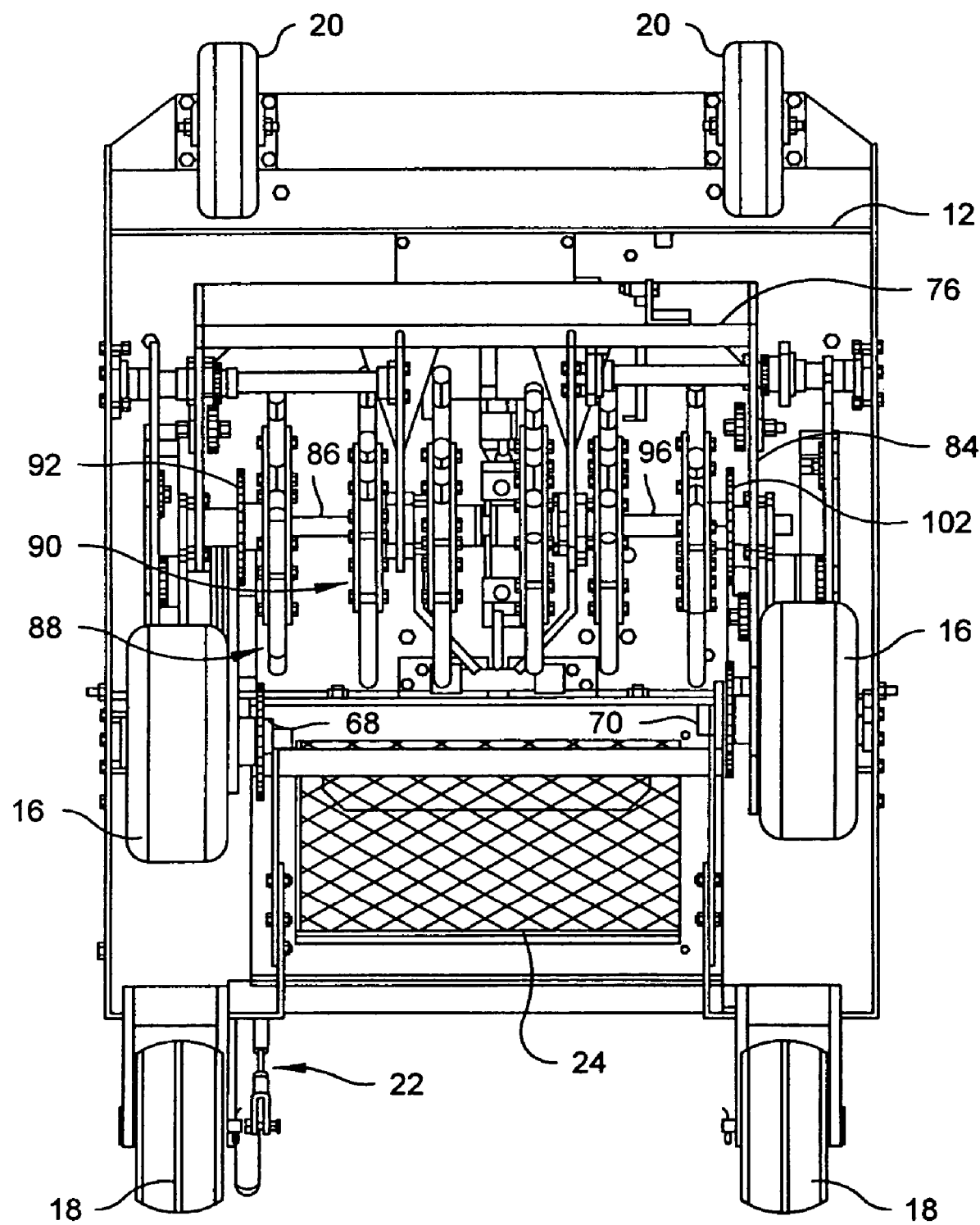
FIG. 2 is a bottom plan view of the turf aerator showing the relationship of the tine carrying shafts relative to the drive wheels.

A platform 24 for the operator is mounted on the frame 12 substantially between the driven wheels 16 and the rear non-driven wheels 18 as best seen in FIG. 2. An operating treadle 26 is mounted at the forward side of the platform 24 when the treadle is depressed by the operator, the engine can be controlled by the throttle lever 25. When the treadle 26 is not depressed, the engine can only operate at idle speed regardless of the operation of the throttle lever 25.

Figure 3:
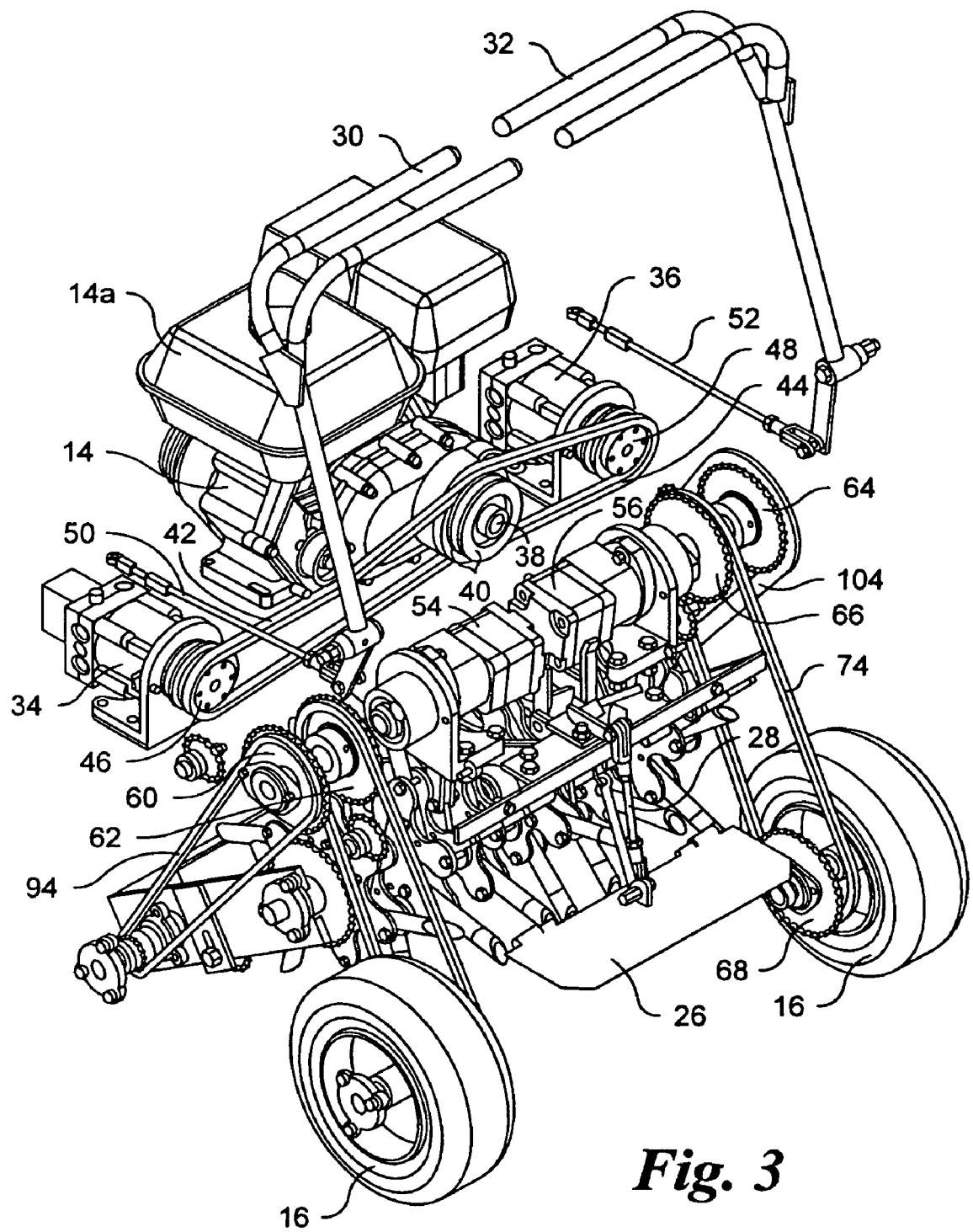
FIG. 3 is an exploded view with the internal combustion engine and hydraulic pumps shown in spaced substantially operative arrangement relative to the hydraulic motors, the tine carrying shafts and the drive for the wheels.

A pair of operating handles 30, 32 are pivotably on the frame 12 and are operatively connected to a left hydraulic pump 34 and a right hydraulic pump 36, respectively, as viewed in FIG. 3 by links 50 and 52. The internal combustion engine 14 is provided with an output shaft 38 having a pair of pulleys 40 mounted thereon. Rotation of the drive shaft 38 is imparted to the left and right hydraulic pumps 34, 36 by means of respective belts 42, 44 which are entrained about pulleys 46 and 48 of the left and right hydraulic pumps 34, 36. A pair of control links 50 and 52 are connected to the respective control handles 30 and 32 at one end thereof. The opposite ends of the links 50, 52 are operatively connected to the hydraulic pumps 34,36 respectively, one of the connections being shown in FIG. 1. Thus, the output and pressure of the hydraulic fluid from the left and right hydraulic pumps to the left and right hydraulic motors may be varied to vary the speed of the hydraulic motors. The details of such hydraulic pumps and hydraulic motors are well known in the art and are not shown in detail in the present disclosure. The left hydraulic motor 54 and right hydraulic motor 56 are mounted on the frame 12 above the tine assembly 58 as best seen in FIG. 3. A pair of sprocket wheels 60, 62 are mounted on the output shaft of the left hydraulic motor 54 and a pair of sprocket wheels 64, 66 are mounted on the output shaft of the hydraulic motor 56. The drive wheels 16, 16 are each provided with a sprocket wheel 68, 70. A chain 72 is entrained about the sprocket wheel 62 on the output shaft of the left hydraulic motor 54 and the sprocket wheel 70 on the left drive wheel 16 as viewed in FIG. 3. A chain 74 is also entrained about the sprocket wheel 66 on the drive shaft of the right side hydraulic motor 56 and the sprocket wheel 68 on the right drive wheel 16 as viewed in FIG. 3. Thus the drive wheels 16, 16 are driven by the hydraulic motors 54, 56.

Figure 4:
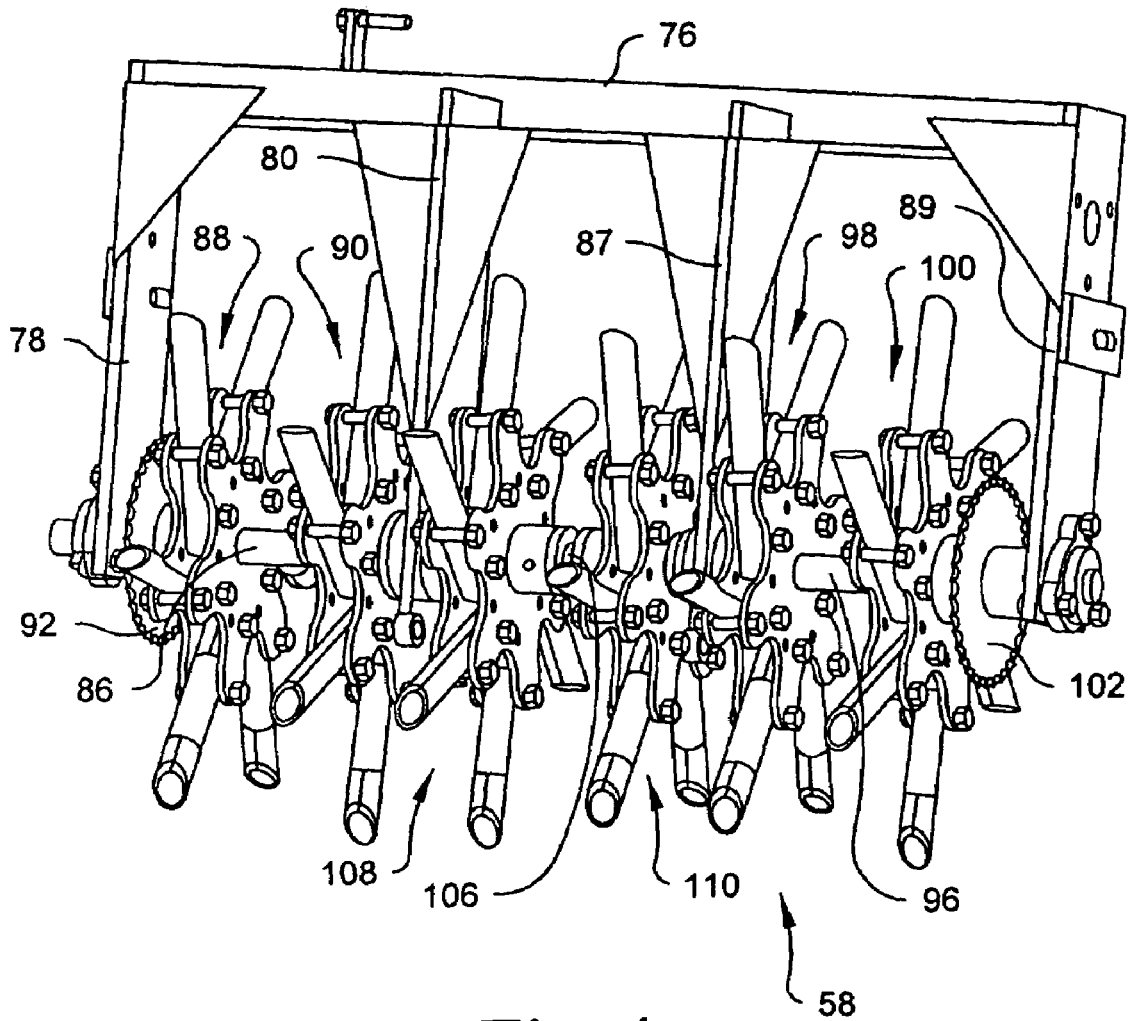
FIG. 4 is a view of the tine assembly per se.

The tine assembly as best seen in FIGS. 2–4 is comprised of a transverse frame 76 having four depending supports 78, 80, 87, and 84. A first shaft 86 is rotatably mounted between the dependent supports 78, 80 and a pair of conventional tine assemblies 88, 90 are connected to the shaft 86 for rotation therewith. A sprocket wheel 92 is also mounted on the shaft 86 and is driven by means of a chain 93 which in turn is driven by the sprocket wheel (not shown) on shaft 95 which is driven by chain 94 and sprocket wheel 60 driven by the left side hydraulic motor 54. A second shaft 96 is mounted for rotation between the supports 87, 84 and a pair of conventional tine assemblies 98, 100 are mounted on the shaft 96 for rotation therewith. A sprocket wheel 102 is also mounted on the shaft 96 and is driven by a chain and sprocket wheel (not shown) on a shaft (not shown) similar to shaft 95 which is driven through a chain 104 trained about the sprocket wheel 64 which is driven by the right side hydraulic motor 56. A third shaft 106 is rotatably mounted between the supports 80, 87 and a pair of tine assemblies 108 and 110 are rotatably mounted on the shaft 106 independently of each other. The shaft 106 is not driven and accordingly the tine assemblies 108, 110 simply free wheel and receive their rotation by contact with the ground as the turf aerator moves along the ground. The left and right shafts 86, 96 may be selectively or simultaneously rotated by the hydraulic motors 54, 56 under the control of the levers 30, 32. As a result the rotation of the left and right tine assemblies may be conveniently selected to assist the operator in turning the turf aerator or traversing a slope with the turf aerator.

Figure 5:
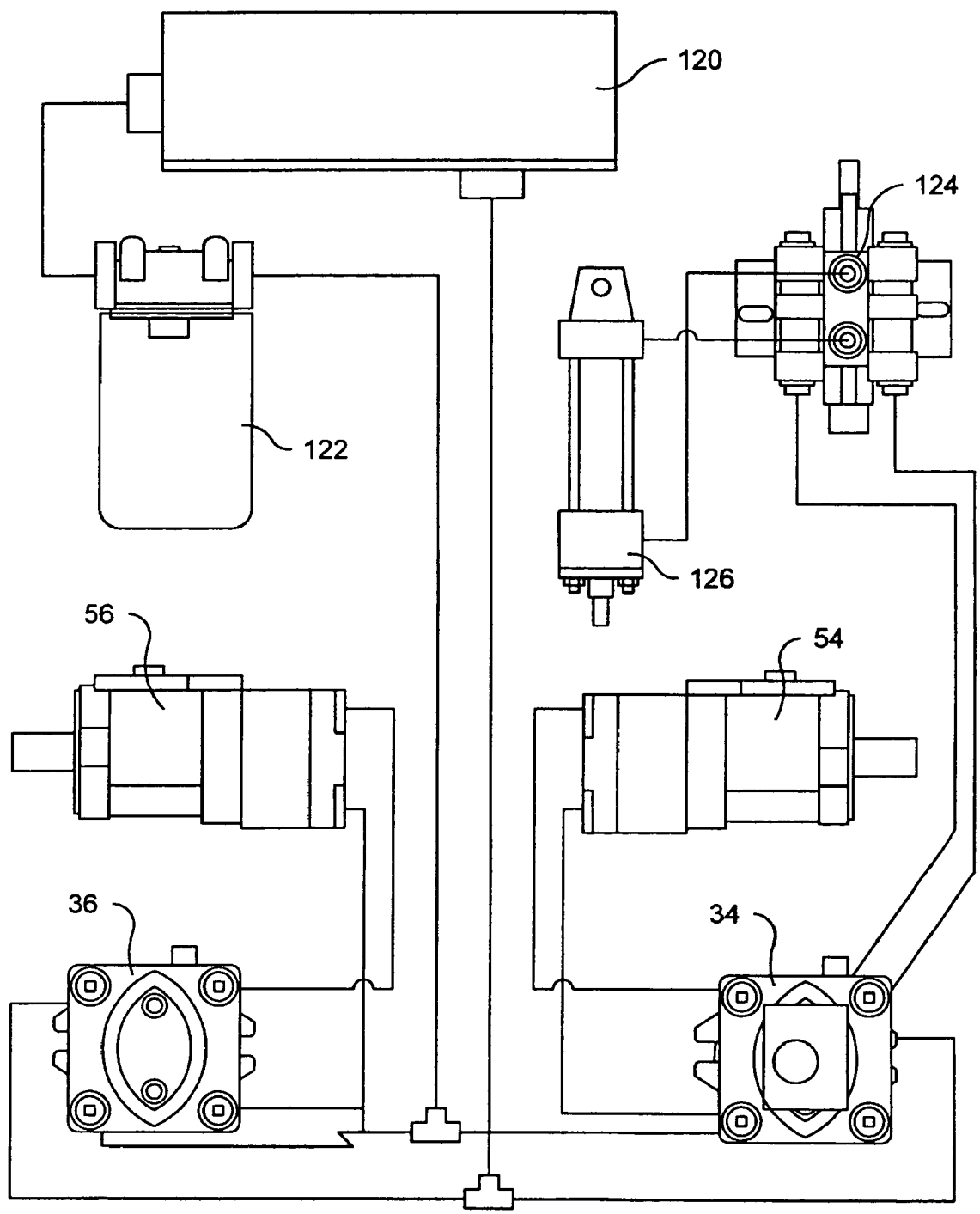
FIG. 5 is a schematic view showing the hydraulic circuitry interconnecting the various components.

FIG. 5 is a schematic showing of the hydraulic circuitry interconnecting the hydraulic motors to the hydraulic pumps. In addition to the hydraulic motors and the hydraulic pumps a reservoir tank 120, a filter 122 and a control valve 124 are provided. In addition to controlling the hydraulic pumps and hydraulic motors the control valve also controls a cylinder 126.

The foregoing and other objects and features of the inventions will be more obvious in view of the following claims for raising and lowering the tine assembly.

What is claimed is:

1. A turf aerator comprising a frame, motor means for driving the aerator, first, second and third aerator shafts rotatively mounted in said frame in axial alignment with each other, each having a plurality of tines mounted thereon for aerating the turf, said second aerator shaft being disposed intermediate said first and third aerator shafts and mounted in said frame for free-willing operation, said second aerator shaft including at least a first tine assembly and a second tine assembly independently, rotatably mounted thereon and drive means operatively connected between said motor means and said first and third aerator shaft for selectively driving either the first aerator shaft or the third aerator shaft or both the first and third aerator shafts simultaneously, the first and third aerator shafts drivable at different speeds by the drive means to assist in turning the turf aerator or traversing a slope.

2. A turf aerator as set forth in claim 1, wherein said motor means has an output shaft, first and second hydraulic pump means operatively connected to said output shaft, first and second hydraulic motors operatively connected to said first and second hydraulic pumps and drive means operatively connecting first and second hydraulic motors to said first and third aerator shafts, respectively.

3. A turf aerator as set forth in claim 2, further comprising first and second control levers mounted on said frame and operatively connected to said first and second hydraulic pumps respectively for controlling the operation of the pumps which in turn controls the operation of the motors which in turn control the rotation of the first and third aerator shafts.

\* \* \* \* \*